(12) United States Patent
Montcalm

(10) Patent No.: US 10,547,746 B2
(45) Date of Patent: Jan. 28, 2020

(54) METHOD AND SYSTEM FOR DYNAMICALLY CHANGING A SERVICE LEVEL AGREEMENT

(71) Applicant: Mitel Networks Corporation, Ottawa (CA)

(72) Inventor: Michael Montcalm, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 170 days.

(21) Appl. No.: 15/795,069

(22) Filed: Oct. 26, 2017

(65) Prior Publication Data
US 2019/0132449 A1 May 2, 2019

(51) Int. Cl.
*H04M 3/51* (2006.01)
*H04M 3/428* (2006.01)
*H04M 3/523* (2006.01)

(52) U.S. Cl.
CPC ....... *H04M 3/5175* (2013.01); *H04M 3/4285* (2013.01); *H04M 3/5238* (2013.01); *H04M 2203/402* (2013.01); *H04M 2203/551* (2013.01); *H04M 2203/558* (2013.01)

(58) Field of Classification Search
CPC ............ H04M 3/5175; H04M 3/5183; H04M 2201/38; H04M 2201/42
See application file for complete search history.

(56) References Cited

U.S. PATENT DOCUMENTS

| | | | |
|---|---|---|---|
| 8,175,254 B2 | 5/2012 | Li et al. | |
| 9,167,095 B1 * | 10/2015 | Selvin | H04M 3/5175 |
| 9,742,915 B1 * | 8/2017 | Daddi | H04M 3/5175 |
| 2005/0256946 A1 | 11/2005 | Childress et al. | |
| 2007/0211879 A1 * | 9/2007 | Shaffer | H04M 3/4938 379/265.01 |
| 2014/0177818 A1 * | 6/2014 | Chang | H04M 3/5183 379/265.09 |
| 2016/0036652 A1 | 2/2016 | Bellini, III et al. | |
| 2018/0285789 A1 * | 10/2018 | Montcalm | G06Q 10/063 |

* cited by examiner

Primary Examiner — Nafiz E Hoque

(57) ABSTRACT

A system and method for dynamically updating a service level agreement during a communication with a contact center are disclosed. The system and method are configured to display an initial time associated with a predetermine SLA path and then update the displayed time based on a communication between an agent and a customer.

18 Claims, 5 Drawing Sheets

| Ref_id | Question_id | Questionnaire_id | Agent_id | Cust_id | Date_timestamp | Actual_time |
|---|---|---|---|---|---|---|
| Id00001 | Q1234 | X1 | A18005551234 | C5678 | 20170131144500 | 0:44 |
| Id00002 | Q1234 | X1 | A18005551256 | C5690 | 20170131161200 | 0:45 |
| Id00003 | Q2345 | X1 | A18005551234 | C6001 | 20170131200300 | 0:27 |
| Id00004 | Q2345 | X1 | A18005551234 | C5409 | 20170131154500 | 0:25 |
| • | • | • | • | • | • | • |

FIG. 5

METHOD AND SYSTEM FOR DYNAMICALLY CHANGING A SERVICE LEVEL AGREEMENT

FIELD OF THE INVENTION

The present disclosure generally relates to communication networks. More particularly, the disclosure relates to methods and systems for dynamically updating a service level agreement during a communication.

BACKGROUND OF THE DISCLOSURE

A service level agreement (SLA) is an agreement between parties, such as a service provider and a customer. Call centers often use an SLA to specify that a certain number or percentage of calls will be answered within a specified period of time and/or that once a call is answered, the issue will be resolved by a call center agent within a specified period of time. The SLA can also be used as a metric to measure the performance of the call center and its employees. As a result, an agent's compensation can be based, at least in part, on performance relative to terms in the SLA.

Typically, wait times, percentages of times that do and/or that don't meet SLAs, and times to resolve issues are fixed based on, for example, predetermined expected times to resolve various issues. The predetermined expected times can be based on, for example, an average time to resolve various issues. In some cases, an SLA can be adjusted based on a number of callers trying to reach an agent at a call center. In such cases, an estimated wait time can be conveyed to a customer, and this wait time can be adjusted based on the number of callers trying to reach an agent. However, an SLA generally does not adequately take into account the diversity of issues that may be addressed by an agent or time to address specific issues and relay such information to a customer and/or an agent. Furthermore, a customer may call in to or be transferred to an incorrect agent queue. Additionally, or alternatively, a customer can call a call center and initially provide incorrect information to an agent or a system regarding an issue to be resolved. In these cases, an incorrect SLA time may be allocated to an agent. As a result, an agent's performance may be calculated on incorrect metrics and/or an agent may become anxious or try to rush answers to nevertheless meet goals set in the SLA, in order to meet the agent's metrics or compensation goals. Accordingly, improved systems and methods for dynamically updating a service level agreement during a communication are desired.

Any discussion of problems and provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIG. 5 illustrates a database for use with systems and methods in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure provide systems and methods for dynamically setting service level agreements (SLA) at a contact center and for displaying updated SLA times to an agent. While the ways in which the exemplary methods and systems address the shortcomings of prior systems and methods are described in more detail below, in general, system and methods in accordance with the disclosure provide updated SLA times to an agent (and optionally a customer) during a call by determining an initial time associated with one (e.g., a longest remaining path) SLA path selected from list of a plurality of paths and dynamically updating the time displayed to an agent as the SLA path changes. By way of examples, a time that a customer and/or agent has been on a call and the dynamically updated SLA path time can be displayed to an agent and/or customer.

Figure 1:
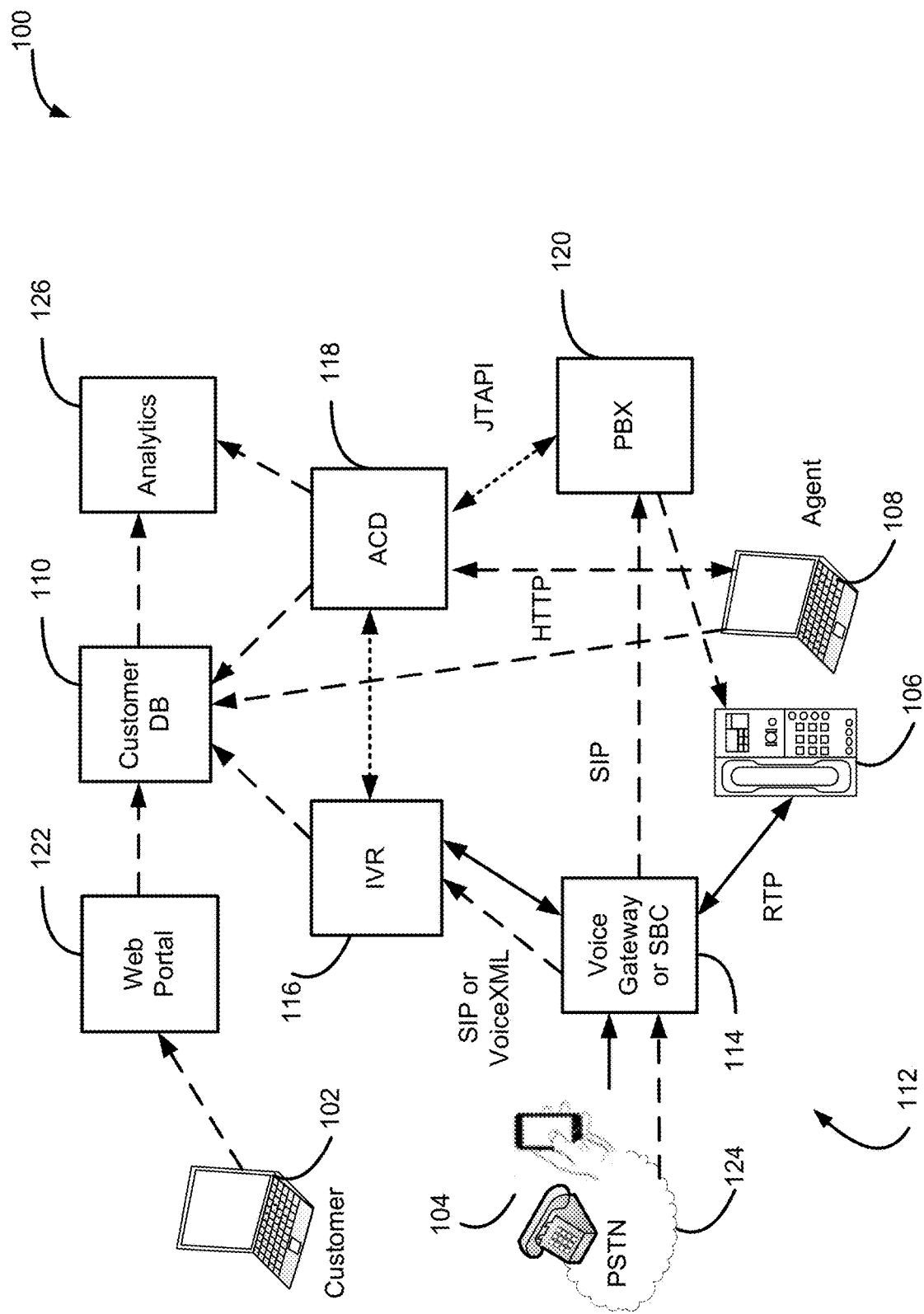
FIG. 1 illustrates a system for dynamically updating a service level agreement during a communication in accordance with exemplary embodiments of the disclosure.

Turing now to the figures, FIG. 1 illustrates a system 100 for dynamically updating an SLA during a communication in accordance with at least one embodiment of the disclosure. System 100 includes one or more customer devices 102, 104, one or more agent devices 106, 108, a database 110, and a communication network 112. In the illustrated example, communication network 112 includes a gateway or session border controller (SBC) 114, an interactive voice response (IVR) system 116, an automated call distribution (ACD) system 118, a private branch exchange (PBX) 120, and an analytics system 126. As illustrated, communication network 112 can be coupled to the Internet via a web portal 122 and/or a telephone network 124 via the gateway/SBC 114. Exemplary communication protocols used to communicate/transmit information between various components of system 100 are illustrated in FIG. 1. However, unless otherwise noted, system 100 is not limited to such communication protocols.

The one or more customer devices 102, 104 can include any suitable device with wired or wireless communication (e.g., audio and/or video) features. For example, customer devices 102, 104 can include a wearable device, a tablet computer, a wired phone, a mobile phone, a personal (e.g., laptop or desktop) computer, a streaming device, such as a game console or other media streaming device, or the like. As set forth in more detail below, customer devices 102, 104 can access network 112 via voice gateway/SBC 114 or via web portal 122.

Similarly, the one or more or more agent devices 106, 108 can include any suitable device with wired or wireless communication features, such as any of the customer devices noted above. Agent devices 106, 107 can also include an application or client that performs various functions as described herein. In accordance with various examples of the disclosure the application or client displays information from a database (e.g., database 110), including a time associated with an SLA (e.g., an initial time and dynamically updated time(s)) in response to information provided by the agent using the client or application. The client or application can receive input from an agent, and the input can be used to determine the updated SLA path and time.

Database 110 can include any suitable database, such as Microsoft SQL Server, MySQL, Microsoft Access, Oracle, etc. Agent devices 106, 108 and/or other components of system 100 can include all or part of database 110. Alternatively, database can be a stand-alone component of system 100.

FIG. 5 illustrates a database 500 in accordance with at least one embodiment of the disclosure. Database 500 includes reference identifiers 502, question identifications 504, questionnaire identifiers 506, agent identifiers 508, customer identifiers 510, date and time identifiers 512, and times 514 associated with each reference identifier. Database 500 (or another database) can also include times associated with each question identification 504. Reference identifiers 502 can be used to identify each call. Question identifications 504 correspond to a linear block or path of questions (sometimes referred to herein as an SLA path), as discussed in more detail below. Questionnaire identifiers 506 correspond to a set of questions corresponding to a plurality of SLA paths. Agent identifiers 508 correspond to each of the agents. Customer identifiers 510 correspond to each of the customers. Date and time identifiers 512 correspond to the date and time that a call corresponding to a reference identifier was initialed. And, times 514 are the recorded times to complete a call associated with the corresponding reference identifier 502.

Referring again to FIG. 1, in the illustrated example, communication network 112 is an internet protocol (IP) network. However, unless otherwise noted, such a network is not necessary to practice certain aspects of exemplary embodiments of the disclosure. Exemplary types of networks include a local area network, a wide-area network, a metropolitan area network, and wireless networks. Various components of network 112 can be coupled to one or more other components using an Ethernet connection, other wired connections, and/or wireless interfaces. As illustrated, network 112 can be coupled to other networks and/or to other devices typically coupled to networks.

Voice gateway/SBC 114 can include any suitable devices to connect calls between PSTN 124 and network 112. For example, voice gateway/SBC 114 can be or include a router configured to route calls between PSTN and PBX 120. An exemplary voice gateway/SBC 114 can include a Mitel Border Gateway (MBG) available from Mitel Networks.

IVR system 116 can be used to allow customers to input information using voice and/or tones (e.g., Dual Tone Multiple Frequencies (DTMF) tones). As set forth in more detail below, such information can be provided to agent devices 106, 108.

ACD system 118 can be used to answer calls from one or more customer devices 102, 104 and distribute the calls to one or more agent devices 106, 108. The calls can be distributed based on, for example, a voice menu to direct callers based on the customer's selection, a customer's telephone number, a time of day the call was processed, and/or wait times associated with one or more agent devices 106, 108.

PBX 120 or other suitable telephone exchange or switching system/server provides a connection between customer devices 102, 104 and agent devices 106, 108 within an exchange. Suitable PBX devices are available from Mitel Networks.

Web portal 122 can be used by customer device 102, 104 to access network 112. Web portal 122 can be used to collect information from customers using customer devices 102, 104. As illustrated in FIG. 1, web portal 112 can be coupled to database 110, such that information entered into web portal 122 can be stored in database 110.

Analytics system 126 can be used to analyze call information and be used to determine to which agent devices 106, 1008 calls can be transferred to. Additionally, or alternatively, analytics system 126 can be used to update SLAs and provide the updated SLAs to agent devices 106, 108, customer devices 102, 104, and/or to other devices.

System 100 also includes a processor, which can form part of analytics system 126, agent devices 106, 108, PBX 120, or another component of system 100. The processor can access information in database 110 (or another suitable database) to determine an initial SLA path from a plurality of SLA paths and to retrieve the associated time for the initial SLA path from a plurality of times from the database.

In general, system 100 can be used to connect one or more customer devices 102, 104 to one or more agent devices during a communication and to display SLA times to at least the agent during the communication. In accordance with exemplary embodiments of the disclosure, the SLA times are dynamically updated during the communication based on answers provided using the one or more customer devices 102, 104 to questions provided using the one or more agent devices 106, 108. The updated SLA times can be displayed on the one or more agent devices 106, 108 and/or information can be conveyed to one or more customer—e.g., during a call or while the one or more customer devices are placed on hold.

Figure 2:
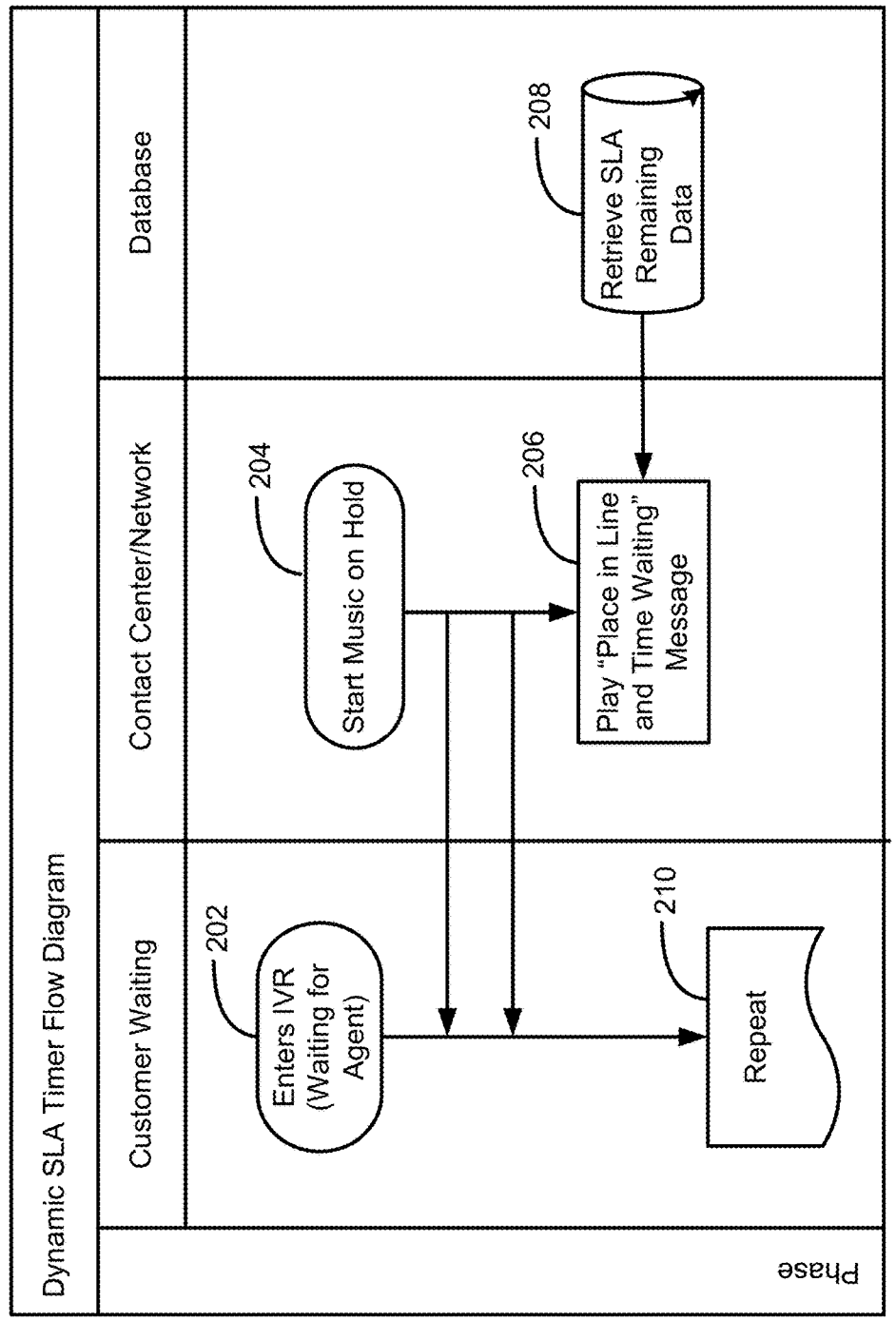
FIG. 2 illustrates a dynamic service level agreement (SLA) timer flow diagram in accordance with exemplary embodiments of the disclosure.

FIG. 2 illustrates a dynamic SLA flow method 200 in accordance with various embodiments of the disclosure. The steps illustrated in FIG. 2 can be performed using system 100. However, unless otherwise noted, the steps are not limited to performance using system 100. Method 200 includes a step 202 of a customer initiating a call with a contact center and waiting (on hold) to be connected to an agent device. During the waiting period, music or other information can be provided to a customer's device, such as customer devices 102, 104. During the period that a customer is on hold, a "place in line" and/or a "wait time remaining" message is provided to one or more customer devices during step 206. As noted above, SLAs can be updated based on matters to be resolved (e.g., particular SLA paths taken) during a call. The updated SLA information can be provided to a database (e.g., database 110) and the updated SLA time can be retrieved from the database and used to provide a revised "wait time remaining" message to a customer device (steps 208 and 206). This process can be repeated (step 210)—e.g., based on an amount of time of a call, a predetermined frequency, as the SLAs are updated, or the like—and the same steps can be performed for one or more customer devices connected to a communication. The updated time associated with the updated SLA path can be calculated and sent (e.g., pushed) to the agent device using a server or other device (a timer), that forms part of an IVR—e.g., IVR system 116, an ACD—e.g., ACD system 118, a PBX—e.g., PBX 120, or another server. By way of particular example, the updated time can be pushed to the customer device (e.g., to each customer device on hold) while on hold using the ACD and to an agent device using an electronic communication between the customer device and the agent device using the ACD. Additionally or alternatively, the dynamically updated SLA pate time can be pushed to the customer and/or agent device using chat, short, message service (SMS), or the like. The information can be converted to speech using a text-to-speech converter that can be located on, for example, one or more servers or devices illustrated in FIG. 1.

Figure 3:
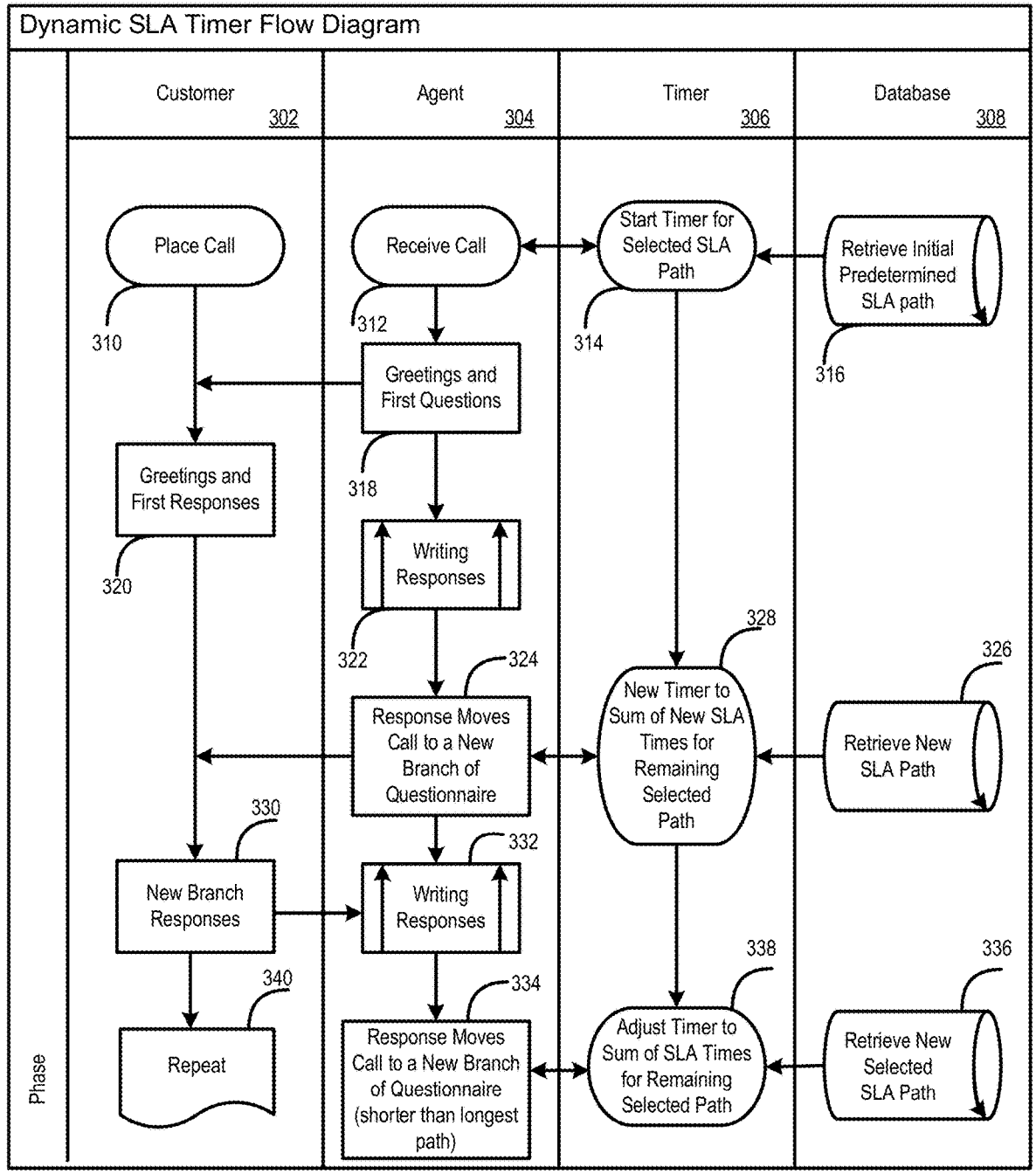
FIG. 3 illustrates a method for dynamically updating a service level agreement during a communication in accordance with exemplary embodiments of the disclosure.

FIG. 3 illustrates a dynamic SLA timer flow diagram of a method 300 in accordance with at least one embodiment of the disclosure. Method 300 illustrates use of a customer device 302, an agent device 304, a timer 306, and a database 208. Customer device 302 can be the same or similar to customer devices 102, 104. Similarly, agent device 304 can be the same or similar to agent devices 106, 108. Timer 306 can comprise a clock (e.g., an internal clock of a computing device) and can form part of agent device 304, or component of a communication system, such as the IVR, ACD, PBX, other server, or other device of the communication system, or be a stand-alone device. Generally, timer 306, which, as noted above can form part of one or more of components within a communication system, such as system 100, will cause to be displayed on agent device 304 and/or customer device 302 an expected wait time and/or an expected time to complete a call based on a dynamic SLA retrieved from database 308, which can be the same or similar to database 110 or a standalone or other database. For example, timer can generate an amount of time remaining for a particular SLA path and dynamically update the time remaining, as described herein. The display can include an amount of elapsed time, the remaining SLA path time, and, in some cases, an average time to complete a current SLA path.

During method 300, a customer device 302 is used to initiate a call (step 310). At step 312, agent device 304 receives the call. Once agent device 304 receives the call (step 312), a predetermined (e.g., longest, shortest, average, most common) SLA path and time associated with the SLA path are retrieved from database 308 (step 316) and timer 306 causes (e.g., pushed) the predetermined SLA time to be displayed on agent device 304 (step 314). Next, an agent or recording, using agent deice 304, can communicate greeting and initial questions to customer device 302 (step 318) and the customer can respond (step 320). Customer responses can then be written to a database (e.g., database 110, 308, or another database). Based on the customer responses during step 320, a new SLA path with a new questionnaire path is selected (step 324) and an associated time path and time can be retrieved from database 308 (step 326) and cause a new time to be displayed on agent device 304 (step 328). As illustrated, this process can be repeated until an SLA path is complete. For example, at step 330, new responses can be provided and the new responses can be written to the database (step 332). A new SLA path with a new questionnaire path is selected (step 334). A new SLA path and associated SLA time can be retrieved from database 308 (step 336) and the remaining time associated with the newly selected SLA path can be displayed on agent device 304 (step 338). Similar steps can be repeated (step 340) until an SLA is completed.

Figure 4:
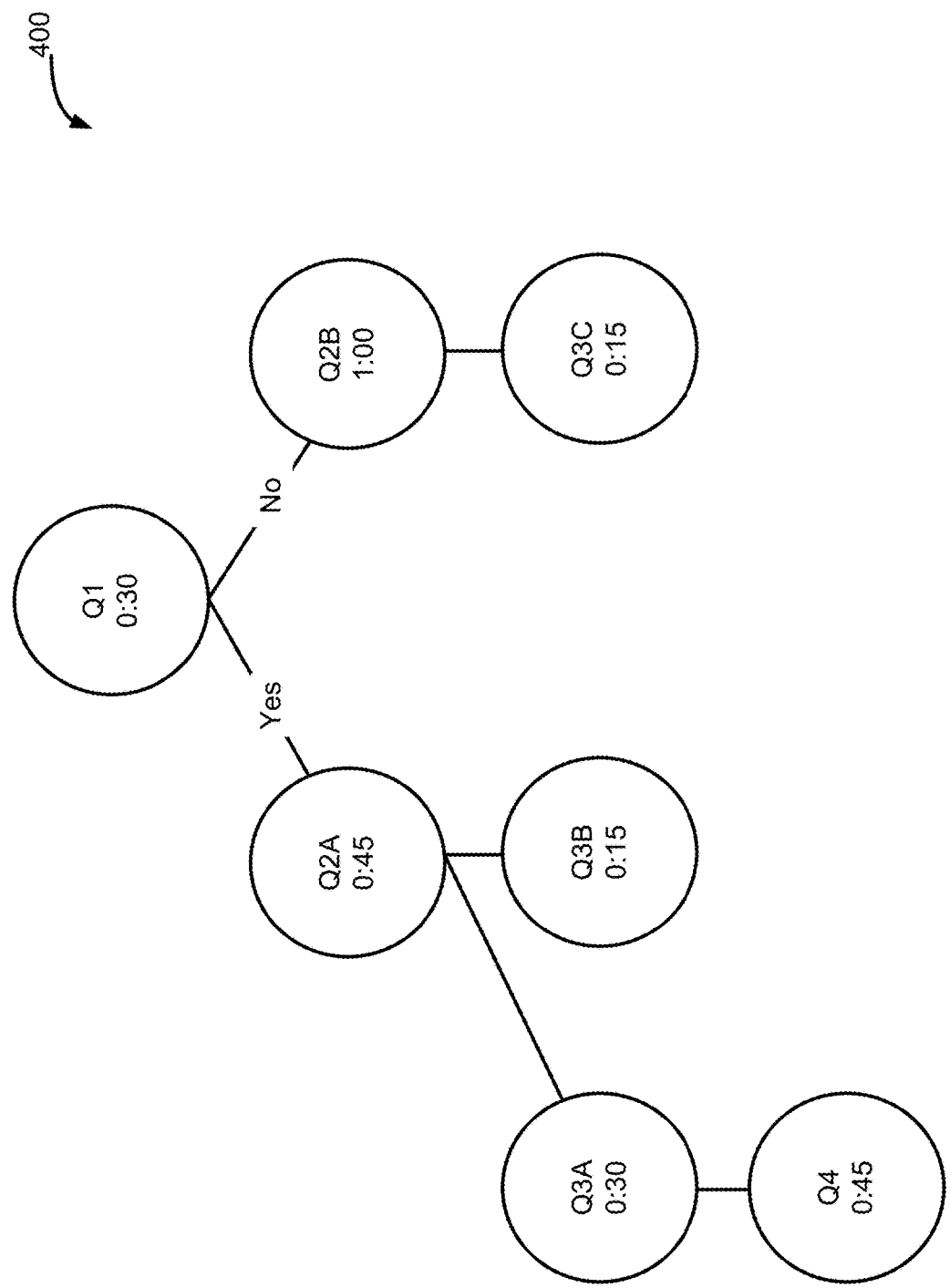
FIG. 4 illustrates a method for calculating a time associated with an SLA path in accordance with exemplary embodiments of the disclosure.

FIG. 4 illustrates a question tree 400, with a plurality of SLA paths, wherein each SLA path includes corresponding questions and associated SLA times. The illustrated example includes a first SLA path including Q1, Q2A, Q3A, and Q4A, a second SLA path including Q1, Q2A, and Q3B, and a third SLA path including Q1, Q2B, and Q3C. In the illustrated example, Q1 (e.g., introductory question or questions) is common to all SLA paths. Question tree 400 can correspond to a questionnaire identifier (e.g., questionnaire identifier 506, illustrated in FIG. 5). It can be appreciated that a question tree can include any suitable number of paths of various lengths.

With reference to FIGS. 3 and 4, when an agent is connected to a call (step 312), timer 306 begins to countdown a time based on a sum of times for a path of a question tree—e.g., a predetermined SLA path from question tree 400. An initial predetermined path can be the path with the longest associated time (e.g., first SLA path including Q1, Q2A, Q3A, and Q4A), or the shortest path, or the most common path, or another predetermined path or times associated with a path. By way of example, the predetermined SLA path can include the longest path and the timer can begin counting down at step 316 from the total of times associated with Q1, Q2A, Q3A, and Q4A.

During a call, a customer can answer a question (e.g., Q1), indicating that the agent should go down the third path, including Q1, Q2B, and Q3C (step 324). At this time, the timer updates the time for the remaining questions (Q2B, and Q3C) and subtracts the already elapsed time from addressing Q1 and displays the remaining time on the agent device. As noted above, such times can also be displayed on the customer device and/or conveyed (audibly or via display) to the communication system, such that the system can determine (e.g., using analytics system 126, agent device 106, 108, or other system 100 component) an estimated hold time that accounts for the dynamically-updated SLA time.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand alone or combined in any combination. It will be recognized that changes and modifications may be made to the exemplary embodiments without departing from the scope of the present invention. These and other changes or modifications are intended to be included within the scope of the present invention, as expressed in the following claims.

I claim:

1. A system for dynamically updating a service level agreement during a communication, the system comprising;
a customer device coupled to a communication network;
an agent device coupled to the communication network;

a database comprising a plurality of SLA times corresponding to a plurality of SLA paths, each SLA path corresponding to a linear block of a plurality of questions;

a processor, wherein the processor accesses information in the database to determine an initial SLA path from the plurality of SLA paths, wherein, after a communication is established between the customer device and the agent device, an SLA time of the plurality of SLA times associated with the initial SLA path is provided to the agent device, wherein the SLA path is updated based on input received on the agent device; and wherein an SLA time of the plurality of SLA times associated with the updated SLA path is retrieved from the database.

2. The system of claim 1, wherein the database further comprises a plurality of questionnaire identifiers, wherein each questionnaire identifier corresponds to a set of questions, the set of questions corresponding to a plurality of SLA paths.

3. The system of claim 1, wherein the database further comprises an actual time of a call corresponding to a taken SLA path.

4. The system of claim 1, wherein a longest time of the plurality of SLA times corresponds to the initial SLA path.

5. The system of claim 1, wherein a shortest time of the plurality of SLA times corresponds to the initial SLA path.

6. The system of claim 1, wherein a most common of the plurality of SLA paths corresponds to the initial SLA path.

7. The system of claim 1, wherein the updated SLA time from the plurality of SLA times associated with the updated SLA path is provided to the agent device.

8. The system of claim 1, wherein the updated SLA time from the plurality of SLA times associated with the updated SLA path is transmitted to the customer device.

9. The system of claim 8, wherein the updated time is transmitted to the customer device as part of a music-on-hold communication.

10. The system of claim 1, wherein the communication network comprises the database.

11. The system of claim 1, wherein the agent device comprises the database.

12. A method for dynamically updating a service level agreement during a communication, the method comprising the steps of:

forming a database comprising a plurality of SLA times and a plurality of SLA paths corresponding to the plurality of SLA times, each SLA path corresponding to a linear block of a plurality of questions;

initiating a communication between a customer device and an agent device;

during the communication, using the agent device, accessing information in the database to determine an initial SLA path form a plurality of SLA paths;

determining an initial time associated with the initial SLA path;

providing the initial time associated with the initial SLA path to the agent device;

updating the SLA path based on inpute received on the agent device; and retrieving an SLA time of the plurality of SLA times associated with the updated SLA path from the database.

13. The method of claim 12, further comprising a step of providing the updated SLA time associated with the updated SLA path to the agent device.

14. The method of claim 13, further comprising a step of providing information corresponding to the updated time to the customer device.

15. The method of claim 13, further comprising a step of providing information corresponding to the updated time to one or more additional customer devices.

16. The method of claim 12, wherein the initial time is a longest time of the plurality of SLA times.

17. The method of claim 12, wherein the initial time is a shortest time of the plurality of SLA times.

18. A method for dynamically updating a service level agreement during a communication, the method comprising the steps of:

forming a database comprising a plurality of SLA times corresponding to a plurality of SLA paths;

initiating a communications between a customer device and an agent device;

during the communication, using the agent device, accessing information in the database to determine an initial SLA path form a plurality of SLA paths;

determining an initial time associated with the initial SLA path;

providing the initial time associated with the initial SLA path to the agent device;

updating the SLA path based on input received on the agent device;

retrieving an SLA time of the plurality of SLA times associated with the updated SLA path from the database;

providing the updated SLA time associated with the updated SLA path to the agent device; and providing information corresponding to the updated SLA time to one or more additional customer devices.

* * * * *